(12) United States Patent
Dalal et al.

(10) Patent No.: US 7,486,416 B2
(45) Date of Patent: Feb. 3, 2009

(54) INTER-SEPARATION DECORRELATOR

(75) Inventors: Edul N. Dalal, Webster, NY (US);
Wencheng Wu, Webster, NY (US);
Robert P. Loce, Webster, NY (US);
Raja Bala, Webster, NY (US); Yeqing Zhang, Penfield, NY (US); Norman W. Zeck, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 708 days.

(21) Appl. No.: 11/143,818

(22) Filed: Jun. 2, 2005

(65) Prior Publication Data

US 2006/0274337 A1 Dec. 7, 2006

(51) Int. Cl.
*H04N 1/60* (2006.01)
*H04N 1/04* (2006.01)
*G03F 3/08* (2006.01)
*G06K 15/00* (2006.01)
*G06K 9/00* (2006.01)

(52) U.S. Cl. ............... 358/1.9; 358/515; 358/518; 358/504; 358/3.23; 382/162; 382/167

(58) Field of Classification Search ............... 358/1.9
See application file for complete search history.

(56) References Cited

U.S. PATENT DOCUMENTS

| 4,579,466 | A | 4/1986 | Sato |
| 4,587,532 | A | 5/1986 | Asano |
| 4,836,119 | A | 6/1989 | Siraco |
| 5,004,222 | A | 4/1991 | Dobashi |
| 5,080,340 | A | 1/1992 | Hacknauer |
| 5,095,342 | A | 3/1992 | Farrell |
| 5,159,395 | A | 10/1992 | Farrell |
| 5,208,640 | A | 5/1993 | Horie |
| 5,272,511 | A | 12/1993 | Conrad |
| 5,326,093 | A | 7/1994 | Sollitt |
| 5,389,969 | A | 2/1995 | Suzuki |
| 5,435,544 | A | 7/1995 | Mandel |
| 5,473,419 | A | 12/1995 | Russel |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Twyler L Haskins
*Assistant Examiner*—David L Suazo
(74) *Attorney, Agent, or Firm*—Fay Sharpe LLP (57) ABSTRACT

Spatially dependent colorant interaction effects are identified and isolated from other aspects of spatially dependent colorant appearance nonuniformities. A decorrelating function for compensating for the identified spatially dependent colorant interaction effects is determined. Spatially dependent single colorant compensating functions for compensating for the other aspects of the spatially dependent colorant appearance nonuniformities may also be determined. Image data is processed through the decorrelating function, thereby generating colorant values that are compensated for spatially dependent colorant interaction effects. Optionally, image data is also processed through the spatially dependent single colorant compensating functions, thereby generating colorant values that are compensated for both aspects of colorant appearance nonuniformities. The two kinds of compensating functions may be determined, calibrated and/or stored at different spatial and temporal frequencies or resolutions. One or both of the compensating functions may be employed to maintain consistency across a plurality of rendering devices (e.g., marking engines).

37 Claims, 5 Drawing Sheets

U.S. PATENT DOCUMENTS

| | | |
|---|---|---|
| 5,504,568 A | 4/1996 | Saraswat |
| 5,525,031 A | 6/1996 | Fox |
| 5,557,367 A | 9/1996 | Yang |
| 5,568,246 A | 10/1996 | Keller |
| 5,570,172 A | 10/1996 | Acquaviva |
| 5,596,416 A | 1/1997 | Barry |
| 5,629,762 A | 5/1997 | Mahoney |
| 5,710,968 A | 1/1998 | Clark |
| 5,778,377 A | 7/1998 | Marlin |
| 5,884,910 A | 3/1999 | Mandel |
| 5,995,721 A | 11/1999 | Rourke |
| 6,059,284 A | 5/2000 | Wolf |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,384,918 B1 | 5/2002 | Hubble, III |
| 6,450,711 B1 | 9/2002 | Conrow |
| 6,476,376 B1 | 11/2002 | Biegelsen |
| 6,476,923 B1 | 11/2002 | Cornell |
| 6,493,098 B1 | 12/2002 | Cornell |
| 6,537,910 B1 | 3/2003 | Burke |
| 6,550,762 B2 | 4/2003 | Stoll |
| 6,554,276 B2 | 4/2003 | Jackson |
| 6,577,925 B1 | 6/2003 | Fromherz |
| 6,607,320 B2 | 8/2003 | Bobrow |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon |
| 6,633,382 B2 | 10/2003 | Hubble, III |
| 6,639,669 B2 | 10/2003 | Hubble, III |
| 6,760,056 B2 | 7/2004 | Klassen et al. |
| 6,819,906 B1 | 11/2004 | Herrmann |
| 2002/0078012 A1 | 6/2002 | Ryan et al. |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2006/0209101 A1* | 9/2006 | Mizes .......................... 347/2 |

OTHER PUBLICATIONS

Desmond Fretz, "Cluster Printing Solution Announced", Today at Xerox (TAX), No. 1129, Aug. 3, 2001.

U.S. Appl. No. 10/761,522, filed Jan. 21, 2004, Mandel et al.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/917,768, filed Aug. 13, 2004, Lofthus et al.
U.S. Appl. No. 10/924,106, filed Aug. 23, 2004, Lofthus et al.
U.S. Appl. No. 10/924,113, filed Aug. 23, 2004, deJong et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,326, filed Nov. 30, 2004, Grace et al.
U.S. Appl. No. 10/999,450, filed Nov. 30, 2004, Lofthus et al.
U.S. Appl. No. 11/000,158, filed Nov. 30, 2004, Roof.
U.S. Appl. No. 11/000,168, filed Nov. 30, 2004, Biegelsen et al.
U.S. Appl. No. 11/000,258, filed Nov. 30, 2004, Roof.
U.S. Appl. No. 11/001,890, filed Dec. 2, 2004, Lofthus et al.
U.S. Appl. No. 11/002,528, filed Dec. 2, 2004, Lofthus et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/081,473, filed Mar. 16, 2005, Moore.
U.S. Appl. No. 11/069,020, filed Feb. 28, 2005, Lofthus et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/120,589, filed May 3, 2005, Contino.
U.S. Appl. No. 11/102,332, filed Apr. 8, 2005, Hindi et al.
U.S. Appl. No. 10/357,687, filed Feb. 4, 2003, Biegelsen et al.
U.S. Appl. No. 10/357,761, filed Feb. 4, 2003, Fromherz et al.
U.S. Appl. No. 10/740,705, filed Dec. 19, 2003, Biegelsen et al.
U.S. Appl. No. 10/812,376, Mar. 29, 2004, Duff et al.
U.S. Appl. No. 10/860,195, filed Jun. 6, 2004, Lofthus et al.
U.S. Appl. No. 10/917,768, filed Aug. 13, 2004, Lofthus.
U.S. Appl. No. 10/922,316, filed Aug. 19, 2004, Zhang et al.
U.S. Appl. No. 10/923,166, filed Aug. 20, 2004, Zhang et al.

* cited by examiner

INTER-SEPARATION DECORRELATOR

BACKGROUND

Embodiments disclosed herein are related to the art of color image rendering. For the most part, they will be described with reference to color image printing. However, methods and systems disclosed herein are applicable to other rendering technologies, such as, for example, color image displays.

In general, image rendering processes are physical in nature. That is, image rendering processes rely on physical structures which can influence rendered image quality and consistency. For instance, variation in phosphor quality or density in a cathode ray tube (CRT) or plasma display, light emitting diode (LED) efficiency in an LED display, and/or spatial variation in the light output of a fluorescent back light in a liquid crystal display (LCD) can cause color appearance variations across the surface of a display device. In printing systems, physical alignments, component tolerances, wear and component age can influence the uniformity with which colorants such as inks and toners are laid down across the surface of print media.

Techniques for spatial uniformity compensation have been developed. For instance, the concept of compensating tone reproduction curves (TRCs), which have been used to calibrate or compensate the overall application of individual colorants in a particular rendering device or print engine, has been extended to include spatial specificity.

For instance, test patches or strips are printed based on individual colorant target gray levels or lightness. Measurements are made of actual or rendered colorant lightnesses or gray levels at various positions across the surface of the test patches or strips. Spatially dependent compensating functions are generated based on these measurements. In operation, desired or target colorant contone, gray level or lightness levels and associated position information are processed through these colorant-specific, spatially dependent compensating functions to generate or determine a compensated colorant contone, gray level or lightness value for the desired position. As such, colorant-specific, spatially dependent compensating functions can be used to improve image quality in a rendering device or printer.

In order to increase throughput, some printers and copiers are being developed which include two or more marking engines. For example, U.S. patent application Ser. No. 10/924,113 filed Aug. 23, 2004 by Jonas M. M. deJong, et al. for a Printing System with Inverter Disposed for Media Velocity Buffering and Registration; U.S. patent application Ser. No. 10/924,106 filed Aug. 23, 2004 by Robert M. Lofthus, et al. for a Printing System with Horizontal Highway and Single Pass Duplex; U.S. patent application Ser. No. 10/924,459 filed Aug. 23, 2004 by Barry P. Mandel, et al. for a Parallel Printing Architecture Consisting of Containerized Image Marking Engine Modules; U.S. patent application Ser. No. 10/860,195 filed Jun. 6, 2004 by Robert M. Lofthus, et al. for a Universal Flexible Plural Printer to Plural Finisher Sheet Integration System; U.S. patent application Ser. No. 10/881,619 filed Jun. 30, 2004 by Daniel G. Bobrow for a Flexible Paper Path Using Multidirectional Path Modules; U.S. patent application Ser. No. 10/761,522 filed Jan. 21, 2004 by Barry P. Mandel, et al. for a High Print Rate Merging and Finishing System for Parallel Printing; U.S. patent application Ser. No. 10/785,211 filed Feb. 24, 2004 by Robert M. Lofthus, et al. for a Universal Flexible Plural Printer to Plural Finisher Sheet Integration System; and U.S. patent application Ser. No. 10/917,768 filed Aug. 13, 2004 by Robert M. Lofthus for a Parallel Printing Architecture Consisting of Containerized Image Marking Engines and Media Feeder Modules, all of which are incorporated herein by reference, describe aspects of tightly integrated document processing systems including a plurality of marking engines.

Additionally, some printers and copiers are being developed using a hypermodular structure to increase modularity and flexibility. These systems may possess a number of distributed processors, sensors, and actuators. For example, U.S. patent application Ser. No. 10/357,687 filed Feb. 4, 2003 by David K. Biegelsen, et al., for Media Path Modules; U.S. patent application Ser. No. 10/357,761 filed Feb. 4, 2003 by Markus P. J. Fromherz, et al., for Frameless Media Path Modules; U.S. patent application Ser. No. 10/740,705 filed Dec. 19, 2003 by David K. Biegelsen, et al., for a Flexible Director Paper Path Module; and U.S. patent application Ser. No. 10/812,376 filed Mar. 29, 2004 by David G. Duff, et al., for a Rotational Jam Clearance Apparatus, all of which are incorporated herein by reference, describe aspects of tightly integrated document processing systems including hypermodules.

The concept of colorant-specific, spatially dependent compensating functions has been further extended to address consistency across a space of desired uniformity that extends across a plurality of marking engines and across time. For example, U.S. patent application Ser. No. 10/922,316, cross referenced above, and U.S. patent application Ser. No. 10/923,166 by Zhang, et al., entitled UNIFORMITY COMPENSATION IN HALFTONED IMAGES filed Aug. 20, 2004, the disclosure of which is totally incorporated herein by reference, discuss the application of sets of colorant-specific, spatially dependent compensating tone reproduction curves (TRCs) over temporal and spatial spaces of desired uniformity that extend across multiple rendering devices or print engines.

Colorant-specific, spatially dependent compensating functions can provide substantial improvements in image quality and image consistency. However, they do not compensate for colorant appearance effects that are correlated to colorant interactions.

In offset printing, the efficiency with which an ink is absorbed or trapped can be influenced by the presence of another ink laid down earlier. Additionally, trapping efficiency is a function of transfer roller pressures. Spatial variations in those pressures may cause spatial variation in interacting colorant appearance. Related colorant appearance variations associated with print-head-to-print-media spacing variations associated with ink jet technology are also anticipated. In electrophotographic processes, spatial variations, due to, for example, manufacturing tolerances, wear, dirt and component age may produce spatially dependent charge, development field, cleaning field, toner concentration, raster output, raster output power, and/or roller pressure variations which may manifest as spatially dependent colorant appearance nonuniformities or variations. Some component or portion of these colorant appearance variations or nonuniformities may be correlated to interactions between colorants.

Therefore, there has been a desire for methods and systems for compensating for correlated or colorant interaction related colorant appearance variation effects.

CROSS REFERENCE

The following applications, the disclosure of which are totally incorporated herein by reference, are mentioned: U.S. patent application Ser. No. 10/922,316 entitled METHOD AND SYSTEMS ACHIEVING PRINT UNIFORMITY USING REDUCED MEMORY OR COMPUTATIONAL REQUIREMENTS, filed Aug. 19, 2004 by Zhang, et al.;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. application Ser. No. 10/999,326, filed Nov. 30, 2004, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 11/070,681, filed Mar. 2, 2005, entitled "GRAY BALANCE FOR A PRINTING SYSTEM OF MULTIPLE MARKING ENGINES," by R. Enrique Viturro, et al.;

U.S. application Ser. No. 11/081,473, filed Mar. 16, 2005, entitled "PRINTING SYSTEM," by Steven R. Moore;

U.S. application Ser. No. 11/084,280, filed Mar. 18, 2005, entitled "SYSTEMS AND METHODS FOR MEASURING UNIFORMITY IN IMAGES," by Howard Mizes;

U.S. application Ser. No. 11/090,502, filed Mar. 25, 2005, entitled IMAGE QUALITY CONTROL METHOD AND APPARATUS FOR MULTIPLE MARKING ENGINE SYSTEMS," by Michael C. Mongeon;

U.S. application Ser. No. 11/095,378, filed Mar. 31, 2005, entitled "IMAGE ON PAPER REGISTRATION ALIGNMENT," by Steven R. Moore, et al.;

U.S. application Ser. No. 11/109,558, filed Apr. 19, 2005, entitled "SYSTEMS AND METHODS FOR REDUCING IMAGE REGISTRATION ERRORS," by Michael R. Furst et al.;

U.S. application Ser. No. 11/109,996, filed Apr. 20, 2005, entitled "PRINTING SYSTEMS," by Mongeon et al.; and U.S. application Ser. No. 11/115,766, Filed Apr. 27, 2005, entitled "IMAGE QUALITY ADJUSTMENT METHOD AND SYSTEM," by Robert E. Grace.

BRIEF DESCRIPTION

Aspects of the present disclosure in embodiments thereof include systems and methods for compensating for spatially dependent colorant appearance variations in output of an image rendering device can include measuring spatial uniformity variations in a rendering process of the image rendering device, identifying spatially dependent colorant interaction effects of the rendering process based on the measured spatial uniformity variations, isolating the identified spatially dependent colorant interaction effects mathematically, determining a spatially dependent decorrelating function compensating for just the mathematically isolated spatially dependent colorant interactions of the rendering process, determining a color description of a desired color, determining a spatial location description regarding a desired location of the desired color, and processing the color description of the desired color through the spatially dependent decorrelating function according to the spatial location description, thereby generating a color description compensated for colorant interactions associated with the desired location of the desired color.

Some embodiments includes measuring spatial uniformity variations in a rendering process of the image rendering device, identifying spatially dependent colorant interaction effects of the rendering process based on the measured spatial uniformity variations, isolating the identified spatially dependent colorant interaction effects mathematically, determining a spatially dependent decorrelating function compensating for just the mathematically isolated spatially dependent colorant interactions of the rendering process, determining a set of colorant-specific spatially dependent compensating functions, receiving a color description of a desired color, receiving a spatial location description regarding a desired location of the desired color, processing the color description of the desired color through the spatially dependent decorrelating function according to the spatial location description, thereby generating a color description compensated for colorant interactions associated with the desired location of the desired color and processing the color description compensated for colorant interactions through selected ones of the colorant-specific spatially dependent compensating functions according to the spatial location description, thereby generating a color description compensated for colorant interactions associated with the desired location of the desired color.

An image processing that is operative to perform methods or compensating for spatially dependent colorant appearance variations can include at least one image rendering device, a colorant interaction based spatial uniformity detector/isolator that is operative to measure spatial uniformity variations in a rendering process of the at least one image rendering device, detect or isolate colorant interaction based aspects of the measured spatial uniformity variations and determine a spatially dependent decorrelating function that compensates for the detected or isolated colorant interaction based aspects of the measured spatial uniformity variations, and a colorant interaction based spatial uniformity variation compensator that is operative to receive the spatially dependent decorrelating function from the colorant interaction based spatial uniformity detector/isolator, to receive a first color and location description and to processes the first color description through the decorrelating function, in accord with the location information, thereby generating a colorant description that is compensated for spatially dependent colorant interaction effects of the at least one image rendering device.

Some embodiments can also include an individual colorant spatial uniformity variation detector that is operative to measure spatial uniformity variations in the rendering process of the at least one image rendering device, detect single colorant based aspects of the measured spatial uniformity variations and determine colorant-specific spatially dependent compensating functions, denoted as, which compensate for noninteractive or monochrome components or aspects of the spatially dependent colorant appearance variations of the measured spatial uniformity variations, and a colorant-specific spatially dependent compensating function processor that is operative to receive the colorant-specific spatially dependent compensating functions from the individual colorant spatial uniformity variation detector, to receive a second color and location description, and to processes the second color description through the colorant specific spatially dependent compensating functions, in accord with the location information, thereby generating a colorant description that is compensated for spatially dependent individual colorant effects of the at least one image rendering device.

DETAILED DESCRIPTION

Figure 1:
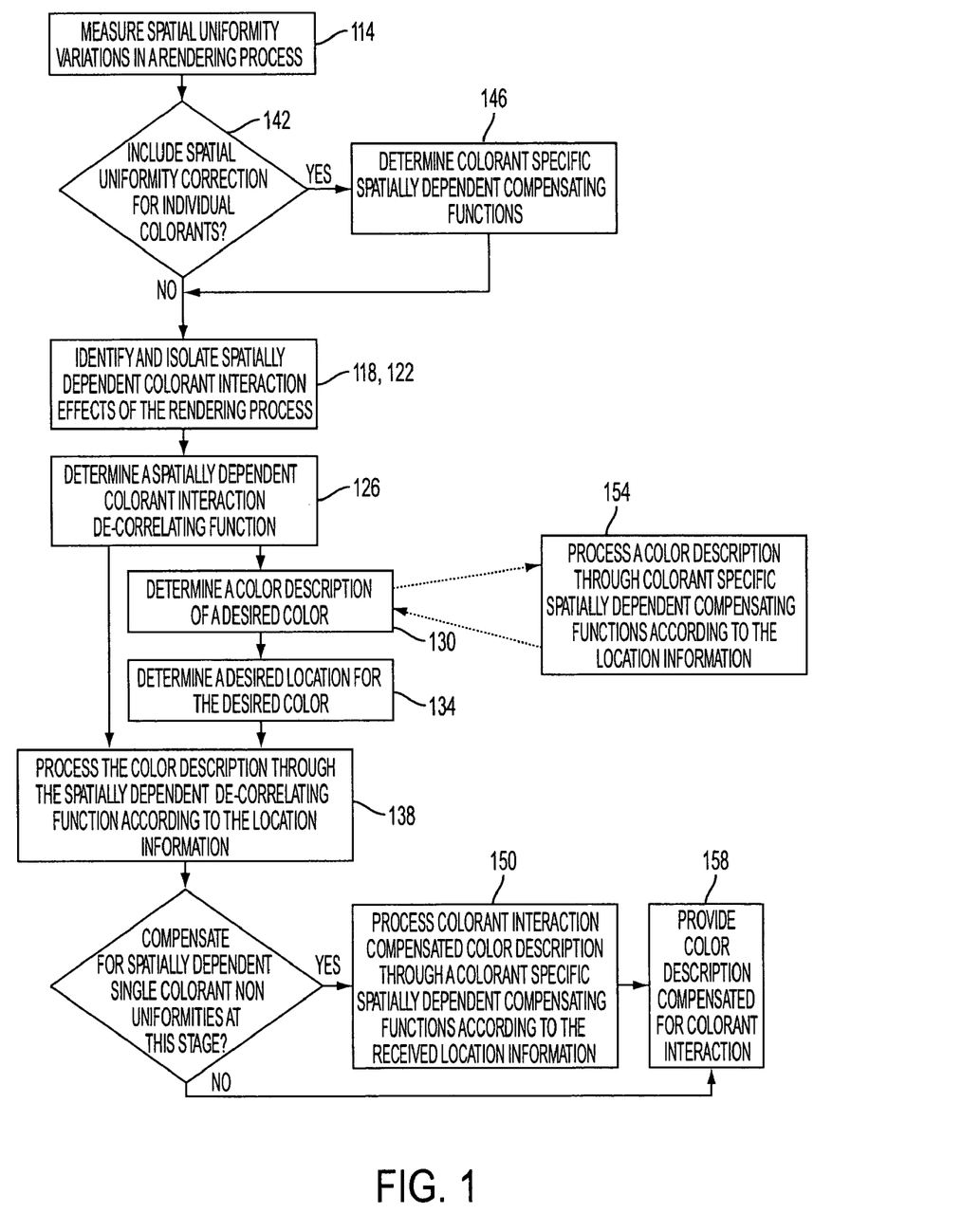
FIG. 1 is a flow diagram outlining a method for compensating for spatially dependent colorant appearance non-uniformities or variations.

Referring to FIG. 1, a method 110 for compensating for spatially dependent color appearance variations in output of an image rendering device can include measuring 114 spatial uniformity variations in the rendering process, identifying 118 and isolating 122 spatially dependent colorant interaction effects of the rendering process, determining 126 a spatially dependent colorant interaction decorrelating or compensating function for the isolated 122 spatially dependent colorant interaction effects, determining 130 a color description of a desired color, determining 134 a desired location for the desired color and processing 138 the color description through the spatially dependent colorant interaction decorrelating function according to the location information.

Some embodiments also include 142 spatial uniformity correction for individual colorants. In those embodiments, the method 110 includes determining 146 colorant-specific, spatially dependent compensating functions. For example, a color description is processed 138 through the spatially dependent decorrelating function according to location information associated with the color description, thereby generating a color description compensated for colorant interactions associated with the desired location of the desired color. The colorant interaction compensated color description is then processed 150 through a set of colorant-specific, spatially dependent compensating functions according to the location information. Alternatively, colorant-specific compensation can occur prior to processing 138 through the spatially dependent decorrelating function. For instance, determining 130 the color description can include receiving a raw color description and processing 154 the raw color description through a set of colorant-specific, spatially dependent compensating functions according to desired location information associated with the raw color description, thereby generating or determining a color description which is compensated for noninteractive or monochrome components or aspects of the spatially dependent colorant appearance variation.

At a minimum, the method 110 provides 158 a color description compensated for spatially dependent colorant interaction effects. Embodiments that include 142. 150 spatial uniformity correction for individual colorants provide color descriptions that are compensated for both spatially dependent colorant interaction effects and spatially dependent monochrome or single colorant related effects.

Measuring 114 spatial uniformity variations in the rendering process can include measuring any aspect of the rendering process that can affect spatial uniformity of a rendered image. For instance, in display devices, measuring 114 spatial uniformity variations can include measuring phosphor or LED efficiencies at a plurality of pixel positions across a display surface. In electrophotographic or xerographic environments, measuring 114 spatial uniformity variations can include measuring spatially dependent development field variations, cleaning field variations, toner concentration variations, roll geometry variations, roll pressure variations, raster output scanner variations, and variations in other aspects of the electrophotographic or xerographic process or effects thereof.

Spatially dependent variation in any of these aspects of xerography or electrophotography may be measurable as spatially dependent colorant appearance variations in a rendered image. Therefore, referring to FIG. 2, measuring 114 spatial uniformity variations in a rendering process can include rendering or printing a plurality 210 of respective color test strips with at least two colorants based on a respective plurality of target colors and measuring a respective plurality of actual colors of a respective plurality of portions of the respective test strips at a respective plurality of locations. For example, the test strips 210 have respective lengths in a direction 214 of suspected variation and the measurements are taken at a plurality of respective locations along the respective lengths of the respective test strips.

Figure 2:
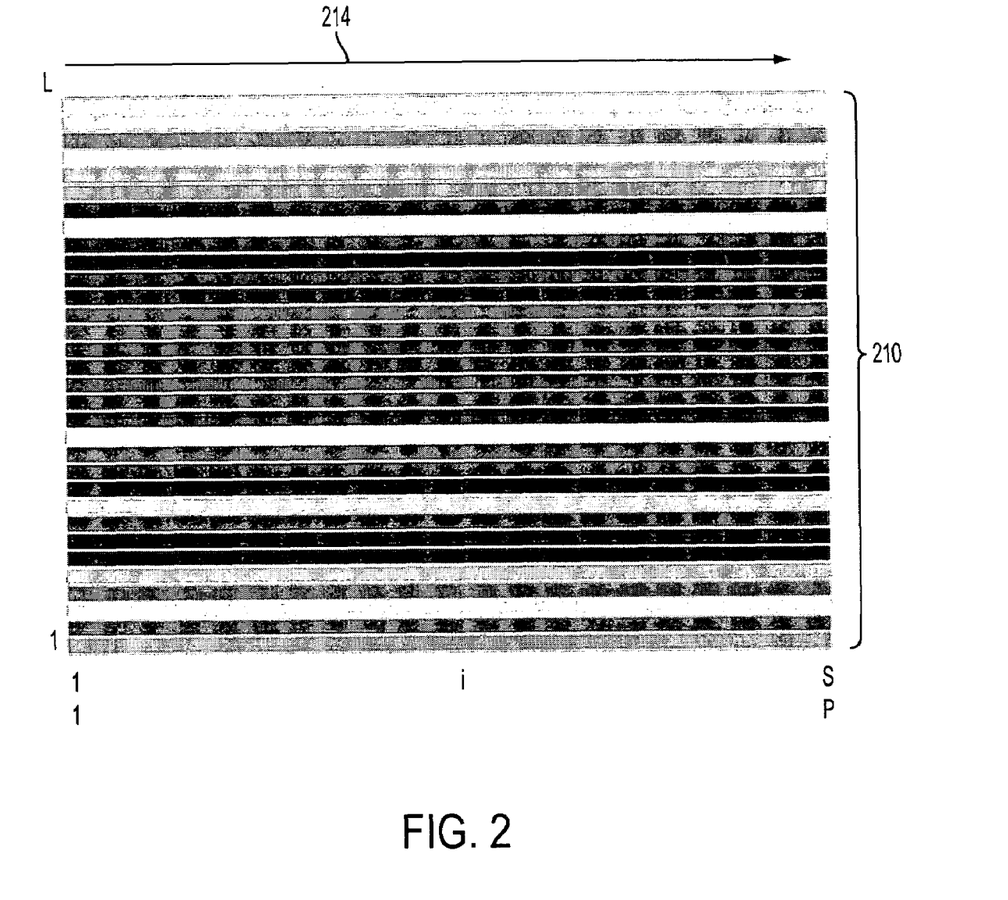
FIG. 2 is a representation of test strips or patches.

Herein, i denotes a location in an image space. For example, i refers generally to a location along the length of a test strip. Where spatially dependent variations are suspected to be a function of two dimensions, or during two-dimensional image rendering, i may be considered to be a vector referencing a point in the two-dimensional space. During measurement 114 or calibration, locations for which actual color measurements are made may be determined by the locations of sensing elements in a color sensor. For instance, the measurements 114 may be taken by one or more sensor scan bars or full-width arrays (FWAs). For example, such sensors may include S sensing elements. Therefore, during calibration, or measurement 114, i may be thought of as ranging from 1 to S. However, rendering or printing resolution of the rendering device(s) may be substantially different in the resolution of a selected sensor or measuring device. Therefore, during a rendering or printing process, i may be considered to range from 1 to P, where P is a number of pixel positions in an image or in a process or cross-process direction of the rendering device or image.

Selected ones of the plurality 210 of test strips may be individually referenced. For example, the test strips are indexed by l and the plurality 210 includes L test strips. Therefore, l may be considered to range from 1 to L.

In the illustrated example, each strip l of the plurality 210 is associated with a uniform contone or gray level value (e.g. a digital value in the range of 0 to 255) and the direction of suspected variation 214 is a cross-process direction. There are 32 strips (i.e.; L=32) included in the plurality 210 of strips. For example, each respective test strip l maybe associated with respective target values of cyan (C) and magenta (M) colorants. Therefore, the test strips l appear as various lightness levels or shades of the color blue. Similar targets or pluralities of test strips can be made for red (magenta and yellow colorants), green (cyan and yellow colorants), and process black (cyan, magenta and yellow colorants), as well as for intermediate hues for determining 126 or calibrating the spatially dependent colorant interaction decorrelating function and/or determining 146 the colorant-specific spatially dependent compensating functions.

Additionally, or alternatively, individual colorant (e.g., cyan or magenta or yellow or black alone) based test strips can be rendered and measured 114 to optimize terms or parameters of the colorant-specific spatially dependent compensating functions.

Some embodiments use a single set of test strips based on all the colorants that are found to be associated with a multi-separation or colorant interaction effect. For example, the colorants to include in such a set of test strips are determined either through experiments or through an analysis of the physics behind the colorant interaction effects.

Determining 126 the spatially dependent colorant interaction decorrelating function can include selecting or determining a functional form for the decorrelating function. In general, the decorrelating function is a multidimensional function that takes 2 or more colorant signals as input, and determines or generates (e.g., 138) 2 or more colorant signals (that are compensated for spatially dependent colorant interaction effects) as output. The decorrelating function can be selected to be derived from a physical model based on known inter-separation correlation in the printing process. Alternatively, the rendering or display or printing process can be considered to be a black box and the decorrelating function can be selected to be based on a model derived strictly on the basis of test or calibration type measurements. For instance, neural network techniques can be used to derive a model for the printing process from calibration or training prints or renderings. The model can also be selected to be based on a combination of such forms.

One functional form the decorrelating function can be selected to have is the functional form of an M×N matrix. For instance M maybe related to a number of colorants or inputs for which correlated effects are anticipated and/or for which colorant interaction effect compensation is desired. N maybe a number of terms selected to be used in the compensating equations represented by the matrix.

For instance, where a rendering device, such as a printing system includes one or more printers that render images with three or four colorants such as, for example, cyan (C), magenta (M), yellow (Y) and optionally black (B), it may be anticipated, based on knowledge of physical aspects of the printing system or of past system performance, that the cyan magenta and yellow colorants may influence each others combined appearance in a spatially dependent manner. An example of a decorrelating function that is applicable to this situation has the functional form of a 3×3 matrix.

For instance, equations represented by the 3×3 matrix may be of a form similar to:

$$C' = \alpha_1 C + \alpha_2 M + \alpha_3 Y \qquad (1)$$

where C, M, Y are the inputs to the decorrelation function, C' is the compensated cyan output value from the function, at least one of $\alpha_1$, $\alpha_2$ and $\alpha_3$ are spatially dependent terms, and $\alpha_2$ and $\alpha_3$ are obtained by analyzing the spatial profile of the printer for CM, and CY combinations, respectively. The example 3×3 matrix may also represent analogous correction equations for the other separations, inputs or colorants (M and Y) and generates analogous compensated output values (M' and Y').

A desirable property to design into the matrix correction is that the overall spatial uniformity correction (decorrelating function plus colorant-specific spatially dependent compensation functions) reduces to the colorant-specific spatially dependent compensation functions correction in the case of single-channel input (e.g., pure C valued pixels). To achieve this property, the diagonal entries of the 3×3 matrix (i.e.; the $\alpha$'s located on the diagonal of the matrix) would be forced to unity. This would mean, for example, that $\alpha_1 = 1$ in Equation (1).

A slightly more complex decorrelating function having a functional form of a 3×4 matrix, wherein the diagonal entries are forced to unity, may represent equations similar to:

$$C' = C + \alpha_1 M + \alpha_2 Y + \alpha_3 MY \qquad (2)$$

where C, M, Y are the inputs to the decorrelating function, C' is the output from the decorrelating function and $\alpha_1$, $\alpha_2$, and $\alpha_3$ are spatially dependent terms that are obtained by analyzing the spatial profile of the printer for CM, CY, and CMY combinations, respectively. The example 3×4 matrix may also represent analogous correction equations for the other separations, inputs or colorants (M and Y) and generates analogous compensated output values (M' and Y'), wherein in the equation for M' the coefficient on the M term is set to unity and in the equation for Y' the coefficient on the Y term is set to unity.

Decorrelating functions having increased generality may have additional terms. For example, a more general decorrelating function may have a selected form similar to:

$$\begin{bmatrix} C' \\ M' \\ Y' \end{bmatrix} = A_l \begin{bmatrix} C \\ M \\ Y \\ CM \\ CY \\ MY \\ CMY \end{bmatrix} \qquad (3)$$

where $A_l$ is a 3×7 matrix with entries $\alpha_{mn}$. The subscript l denotes the fact that the coefficients of A depend on the spatial location. Some of the matrix entries, denoted $\alpha_{mn}$, may be constrained to be, for example, 0 or 1, in order to preserve the aforementioned property for single-channel input.

Other examples of decorrelating functional forms that might be selected include higher-order polynomials, and neural networks or output thereof. For processing efficiency, once derived or determined 126 any of these functions can be implemented as multidimensional lookup tables (LUTs).

Further discussion of identifying 118 and isolating 122 spatially dependant colorant interaction effects and determining 126 the compensating spatially dependant interaction decorrelating function (and optionally determining 146 monochrome or colorant specific spatially dependent compensating functions) is aided by an operational overview of an implementation example.

Figure 3:
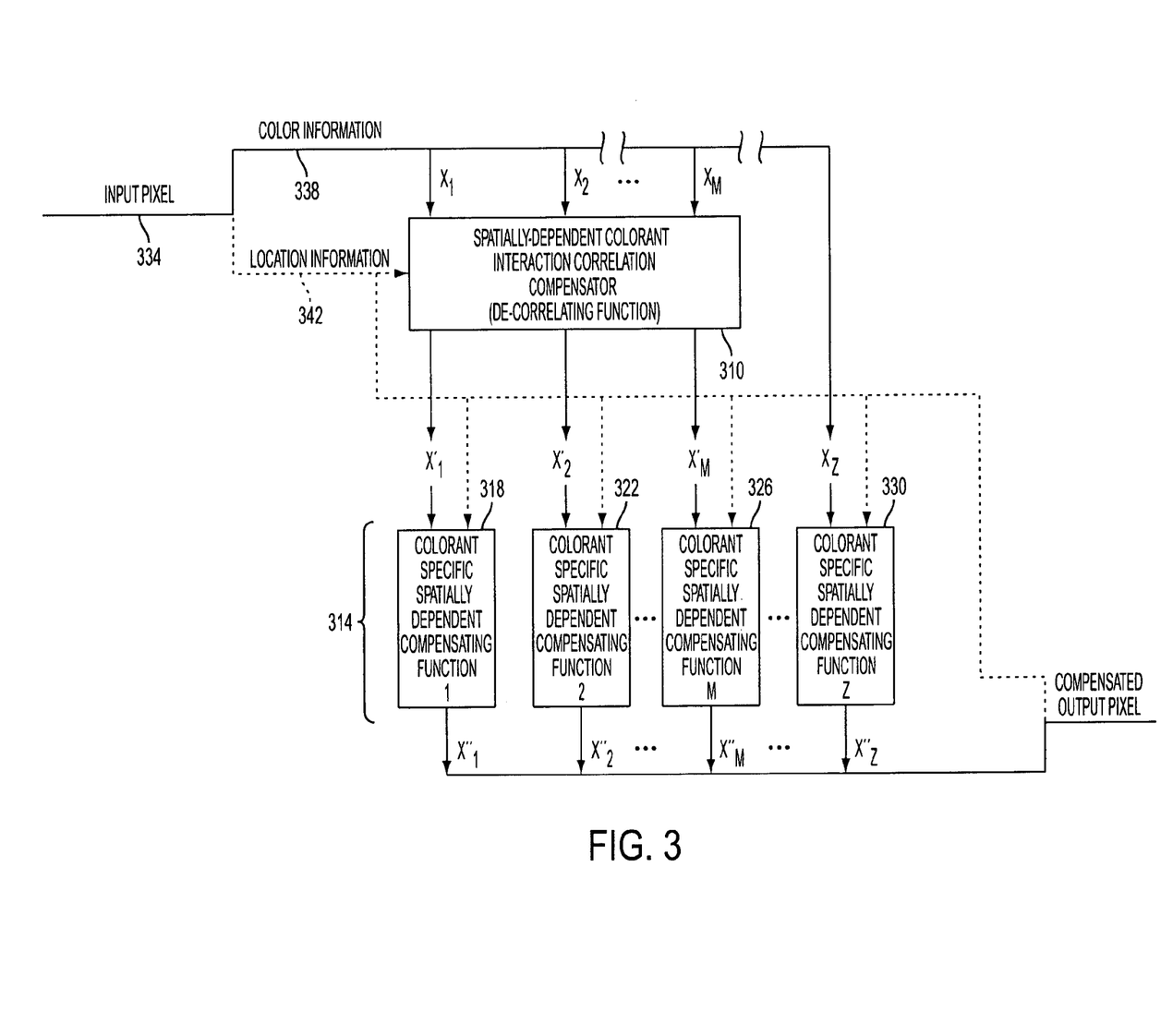
FIG. 3 is a block diagram of an illustrative image path portion that is operative to perform the method of FIG. 1.

Referring to FIG. 3, an illustrative embodiment includes a spatially dependent colorant interaction correlation compensator (SDCICC) 310 and a plurality 314 of colorant-specific spatially dependent compensating functions (CSSDCF) including a first 318, second 322 and optionally, additional CSSDCF(s), including an $M^{th}$ 326 CSSDCF for processing M respective individual output values ($X'_1 \ldots X'_M$) from the SDCICC 310. The plurality 314 of CSSDCF may also include additional SDCICC such as a $Z^{th}$ SDCICC 330 for processing aspects of a color description that are not compensated output of the SDCICC 310. For example, it may be appropriate to process cyan, magenta and yellow colorant value portions of a color description through both the SDCICC 130 and the CSSDCF (e.g., 318, 322, 326) while processing a black colorant value only through a CSSDCF (e.g., 330).

The SDCICC 310 includes a decorrelating function such as any of those described above.

The plurality 314 of CSSDCF may be, for instance, a plurality of single-colorant, spatially dependent, compensating tone reproduction curved (TRCs).

In the illustrated example, the SDCICC 310 is located ahead of the plurality 314 of CSSDCF in an image processing path. In operation, a raw or uncompensated input pixel 334 description is received. The pixel description includes, or can be transformed into, raw or uncompensated input colorant values (e.g., contone or gray level values), denoted herein as $X_1 \ldots X_Z$. In the illustrated example, the color description $X_1 \ldots X_Z$ is determined 130 by extracting or transforming input color information 338 from the input pixel 334. Desired pixel location information 342 is also determined 134 from the input pixel 334 or the pixel's position relative to a received stream of pixels. In the illustrated example, only M of the Z colorant values are to be compensated for colorant interaction effects. Colorant values $X_1 \ldots X_M$ and the desired pixel location information are received as input into the SDCICC 310, which processes 138 the color description through the spatially dependant decorrelating function (SDDF) according to the desired location information 342, thereby generating or determining a color description $X'_1 \ldots X'_M$ (or $X'_1 \ldots X'_M, X_{M+1} \ldots X_Z$) compensated for colorant interactions associated with the desired location. The colorant values (e.g., $X_{M+1} \ldots X_Z$) that are not to be processed by the SDCICC 310 are passed directly to the appropriate CSSDCF (e.g., 330).

In some embodiments the color description $X'_1 \ldots X'_M$ (or $X'_1 \ldots X'_M, X_{M+1} \ldots X_Z$) compensated for colorant interactions associated with the desired location is used to as input to a rendering process to affect the application of marks on print media or the drive level applied to display phosphors or LEDs. However, in the illustrated embodiment, the output $X'_1 \ldots X'_M$ of the SDCICC 310 is further processed 150 through selected ones (i.e., 318, 322, 326) of the plurality 314 of CSSDCF in accord with the desired location information, thereby generating or determining a color description, denoted herein as $X''_1 \ldots X''_Z$, compensated (as a whole) for both colorant interaction related aspects and monochrome or single colorant related aspects of the spatially dependent colorant appearance (or color) variation.

Alternatively, an SDCICC can be located or be applied after a plurality of CSSDCF in an image processing path. In such embodiments, determining 130 a color description can include processing 146 color information from a raw input pixel through a plurality of CSSDCF in accord with location information from the raw pixel. Selected outputs from the plurality of CSSDCF (i.e.; those outputs associated with colorants to be compensated for colorant interaction effects) and the desired location information are then received by the SDCICC as input and processed 138 through the spatially dependant decorrelating function (SDDF) according to the desired location information, thereby generating or determining a color description compensated for both colorant interaction related aspects and monochrome or single colorant related aspects of the spatially dependent colorant appearance (or color) variation or nonuniformities.

A significant portion of the spatially dependent colorant appearance variation or nonuniformity in a rendering device may be associated with aspects of monochrome or single-colorant rendering physics. For example, in electrophotographic or xerographic based rendering devices, spatially dependent colorant variation can be caused by spatial variations in charging and exposure processes related to the transfer of a single colorant. Variation in these aspects can occur at a relatively high temporal frequency. For instance, toner charging physics can change with temperature and/or humidity and with toner replenishment or replacement and dirt can accumulate on charging elements such as corotron and scorotron wires. These aspects of the electrophotographic or xerographic rendering process can change with relatively high spatial and temporal frequencies. On the other hand, it is anticipated that spatially dependent correlated or colorant interaction effects are related to rendering device manufacturing tolerances and component age and wear. Therefore, it is anticipated that spatially dependent colorant interaction effects change relatively slowly, both spatially and temporally.

The multi-stage compensation architecture of the embodiments described above provides for the plurality 314 of CSSDCF which are associated with a relatively simple calibration or determination 126 process, and which compensate for the relatively rapidly changing monochrome or single colorant related variation effects, to be calibrated relatively frequently (with a relatively high temporal frequency), while allowing the relatively more complicated and time consuming calibration or determination procedure of the decorrelation function of the SDCICC 310 to be performed relatively less frequently or on an as needed basis. That is to say, the decorrelating function (i.e, 310) and the plurality 314 of CSSDCF can be calibrated at different times or based on different events. Additionally, the multi-stage architecture allows the decorrelating function to be determined 126 and stored at a lower spatial resolution than might be required for the monochrome or single colorant compensating functions.

Returning now to the discussion of identifying 118 and isolating 122 spatially dependant colorant interaction effects and determining 126 the compensating spatially dependant interaction decorrelating function (and optionally determining 146 monochrome or colorant specific spatially dependent compensating functions), given a chosen functional form for decorrelating function (e.g., equations 1, 2, 3 or some other form), one procedure for identifying 118 and isolating 122 spatially dependant colorant interaction effects and determining 126 the compensating spatially dependant interaction decorrelating function can be outlined as follows.

Provide a set of printed test targets. For instance, print a collection of single colorant strip or patch patterns associated with various uncompensated input or target contone or gray levels (l) for colorants of interest (i.e.; $X_m(l)$, $l=1,2,\ldots,L$, see FIG. 2). Then, measure corresponding actual colors of the strips or patches. For example measure a color of a relatively large area of each strip. Alternatively, measure colors at a plurality of locations in each strip or patch and find an average color for each strip or patch mathematically. For instance, in an embodiment where the colorants at issue are cyan (C), magneta (M) and yellow (Y), measure colorimetric values $L^*(C,M,Y,i), a^*(C,M,Y,i), b^*(C,M,Y,i)$ or reflectance measured, for example, by a scanner, at various locations i for each strip l and determine average $L^*(C,M,Y), a^*(C,M,Y), b^*(C,M,Y)$ values for each strip. Then, based on these target input values and measurements, determine a printer model or mapping $T: CMY \rightarrow L^*a^*b^*$ that predicts uncompensated, average rendering device, or marking engine color response.

Note: where an image rendering system includes a plurality of print engines, the test strips or patches may be rendered by the plurality of rendering devices or marking engines and i is understood to extend across directions of suspected variation associated with the plurality of rendering devices.

With the printer model or mapping determined, define a cost function, denoted as $E_t$, as:

$$E_t = g[E(1), E(2), \ldots E(l), \ldots E(L)] \quad L \geq 1$$

$$E(l) = h(e(l,1), e(l,2), \ldots, e(l,i), \ldots, e(l,S)) \quad S \geq 1$$

$$e(l,i) = T[X''_1(l,i), \ldots X''_m(l,i), \ldots X''_M(l,i)] - Q(l,i)$$

$$[X''_m(l,i) = U_i^{X_m}(X'_1(l), \ldots X'_m(l), \ldots X'_M(l))]_{\text{for each } m}$$

$$[X'_m(l,i) = f_{,i}^{X_m}(X_1(l), \ldots X_m(l), \ldots X_M(l))]_{\text{for each } m} \quad (4)$$

wherein g(.) is a function accumulating error over the various input or target colors of a plurality of respective multi-colorant color test strips or patches as discussed with reference to FIG. 2, l is an index identifying a respective one of the plurality (e.g., 210) of respective color test strips ranging from 1 to L, E(l) is an accumulated color error of the $l^{th}$-indexed color test strip, h(.) is a spatial error accumulation function, i denotes a spatial location along the direction(s) of suspected variation ranging from 1 to S, Q(l,i) is a measured color at location i of the $l^{th}$ test strip, e(l,i) is an error between the measured color Q(l,i) and a color predicted to be rendered by the printer by the model T, M is a number of interacting colorants being compensated for, m is an index for the interacting colorants being compensated for that ranges from 1 to M, $X_m(l)$ denotes the $m^{th}$ input or target colorant value for a respective indexed color test strip l, $f_i^{X_m}$ denotes the decorrelating function output for colorant $X_m$ for spatial location i, $X'_1(l,i), \ldots X'_M(l,i)$ denotes 1 to M spatially dependent colorant interaction compensated colorant values for the target color associated with the indexed color test strip l at location i, $U_i^{X_m}$ denotes an $m^{th}$ colorant-specific spatially dependent compensating function for spatial location l, and $X''_1(l,i), \ldots X''_M(l,i)$ denotes 1 to M colorant values that are compensated for both colorant interaction and monochrome or colorant-specific spatially dependent colorant appearance variation for the target color associated with the indexed color test strip l at location i. Possible selections for the function accumulating error g(.) include, for example, $$g[E(1), E(2), \cdots E(l), \cdots E(L)] = \sum_{l=1}^{L} E(l) \text{ and}$$

$$g[E(1), E(2), \cdots E(l), \cdots E(L)] = \sum_{l=1}^{L} E^2(l).$$

Additionally, measure 114 uniformity variations in the rendering process as described above. For instance, measure 114 some physical aspect of the rendering process. Alternatively, print a number of multi-colorant strips or patches (l=1, ..., L) as outlined above, and take color or lightness measurements at locations or positions along one or more directions of suspected variation (e.g., a cross-process and/or a process direction). Then, based on those measurements, use numerical methods to find values of terms of the decorrelating function $f_i^{X_1} \ldots f_i^{X_M}$ and (if applicable) elements of the colorant-specific spatially dependent compensating functions $U_i^{X_m}$ that minimize the cost function $E_t$. Note, if a particular embodiment doesn't include colorant-specific spatially dependent compensating functions, then $U_i^{X_m}$ in the above equations can be set to unity.

For example, the calibration or cost minimization process finds compensated colorant values (e.g., $X''_1(l, i), \ldots X''_m(l,i), \ldots X''_M(l,i)$) that minimizes the error e(l,i) between the measured color Q(l,i) and the output of the rendering device or marking engine that is predicted by the printer model T. When an embodiment includes non-unity colorant-specific spatially dependent compensating functions $U_1^{X_m}$, the $X''_m(l,i)$ values can be used to create the $U_i^{X_m}$. Alternatively, the $U_i^{X_m}$ are determined by a separate calibration procedure. In any case, the $X''_m(l,i)$ values are used to find the decorrelator function $f_i^{X_1} \ldots f_i^{X_M}$ such that:

$$[X''_m(l,i) = U_i^{X_m}(X'_1(l), \ldots X'_m(l), \ldots X'_M(l))]_{\text{for each } m}$$

$$[X'_m(l,i) = f_i^{X_m}(X_1(l), \ldots X_m(l), \ldots X_M(l))]_{\text{for each } m}$$

When embodiments place the CSSDCF ahead of the SDCICC in the image path, alternate versions of equation (4) may be appropriate.

In the discussions above, i is used to indicate a location or position of interest. However, i should not be construed to be an index or quantized location or position. Spatial (and temporal) resolution over which the methods and systems described herein operate may vary. For example, during identifying 188, isolating 122 and other operations related to determining 126 the spatially dependent colorant interaction decorrelating function and/or determining 146 the colorant specific spatially dependent compensating functions, measurements may be made based on a first or sensor resolution, denoted herein as s. For example, s may be related to a sampling or sensor placement resolution, such as, the sensor placement resolution of a CCD, scan bar or full width array.

In operation, it may be desirable to operate the compensating functions (i.e.; $U_i^{X_m}$ and/or $f_i^{X_1} \ldots f_i^{X_M}$) at a different resolution. For example, the compensating functions may be used to determine spatially dependent compensated colorant values at a pixel resolution, denoted herein as p. For instance, the pixel resolution p may be at a higher resolution than s. In that case, the compensating functions are determined 126, 146 to be in a form that can provide compensated output values at the resolution p. Alternatively, interpolation is used to determine output values for points between points where the determined 126, 146 compensating functions operate. For example, incoming image colorant values $X_m(p,)$, wherein p denotes both a color description and a desired location (e.g.; 334), [m=1, ..., M] are converted to $X'_m(p)$ and optionally $X''_m(p)$ by:

$$[X'_m(p) = f_i^{X_m}(X_1(p), \ldots X_m(p), \ldots X_M(p))]_{\text{for each } m}$$

$$[X''_m(p) = U_i^{X_m}(X'_1(p), \ldots X'_m(p), \ldots X'_M(p))]_{\text{for each } m}$$

and the $X'_m(p)$ or $X''_m(p)$) values are used to drive a rendering or printing process instead of the $X_m(p)$ values.

Additionally, these compensating functions (i.e.; $U_i^{X_m}$ and/or $f_i^{X_1} \ldots f_i^{X_M}$) may be stored at lower resolutions (both in terms of spatial locations and colorant values) than either the resolutions of s or p. Again, interpolation (not necessarily linear interpolation) can be used to achieve the needed output resolutions. Furthermore, $U_i^{X_m}$ and/or $f_i^{X_1} \ldots f_i^{X_M}$ need not be stored at the same resolution. For instance, $U_i^{X_m}$, such as TRCs, may be stored at a resolution denoted herein as j and the decorrelator function $f_i^{X_m}$(i=1, ..., I) maybe stored, for example, as lookup table at a different resolution denoted herein as d.

The example, cost minimization equations discussed above (i.e., 4) can be considered a nonlinear optimization problem One approach to solve this optimization problem is to perform a successive 2-stage optimization, wherein (a) the elements of the colorant-specific spatially dependent compensating functions $U_i^{X_m}$ are optimized from single-channel or single-colorant measurements and (b) the parameters of the decorrelating function are optimized using measurements of multi-channel overprints obtained by processing, for example, digital CMYK data through the $U_i^{X_m}$ (e.g., TRCs) and printing based on the resulting output values.

There are many choices for the functional form of the decorrelating function. In the case where $f_i^{X_m}$ is of the form shown in Eq. (3), the parameters are the matrix elements $\alpha_{mn}$. Many optimization techniques exist for solving this type of problem. For instance sequential quadratic programming can be used, for example, for the case where there are constraints on the $\alpha_{mn}$. Conjugate gradient search can be used, for example, for the case where there are no constraints on the $\alpha_{mn}$. Additionally independent component analysis or principal component analysis (PCA) techniques can be applied. For instance, PCA can be used to determine a reduced set of TRCs to be used as the $U_i^{X_m}$.

Figure 4:
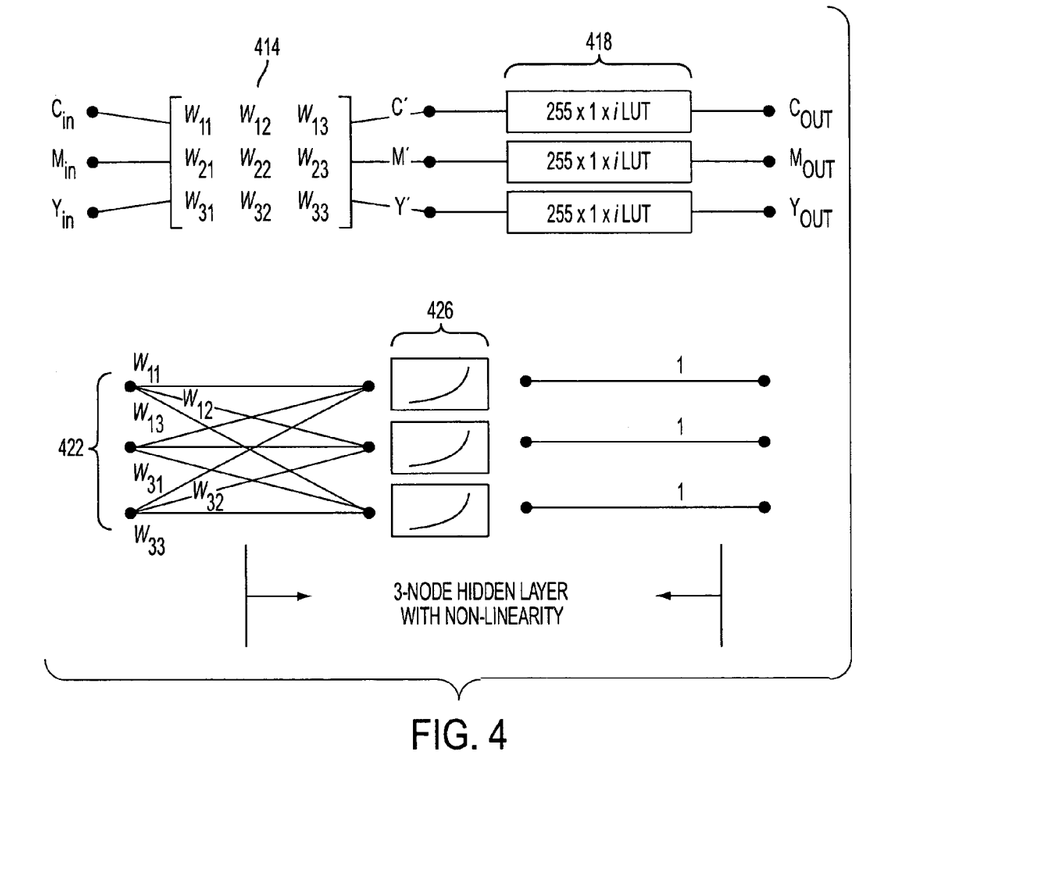
FIG. 4 is a block diagram of a neural network.

Referring to FIG. 4, one class of embodiments use a 3×3 matrix 414 as the functional form of the decorrelating function and a set of TRCs 418 to correct single channel or monochrome nonuniformities. The TRCs 418 are, for example, determined 146 using PCA and the elements, terms or coefficients of the 3×3 matrix 414 are determined 126 using a neural network. For example the neural network 422 includes 1 hidden layer. The 3×3 matrix is simple and provides benefits in system storage and processing bandwidth. The PCA method for deriving TRCs also provides for memory and computation efficiency and appears to provide noise reduction benefits.

Embodiments such as these include printing and measuring 114 single colorant (e.g., C, M, Y) test strips or patterns (e.g., FIG. 2) and identifying 188, isolating 122, determining 126 the spatially dependent colorant interaction decorrelating function and determining 146 the colorant specific spatially dependent compensating functions, can include by using the measured 114 actual colors (Q(l,i)) of the test strips and the PCA method to find spatially dependent cyan, magenta, yellow TRCs, respectively. The TRCs can be used as nonlinearities 426 of the nodes in the hidden layer. On that basis, a neural network optimization tool can then be used to find the optimal spatial 3×3 matrices that minimize the total cost $E_t$.

In some embodiments, neural network techniques are used to determine 126, 146 both $f_i^{X_m}$ and the $U_i^{X_m}$. Those embodiments may include printing and measuring 114 multi-colorant (e.g., CM, CY, MY, etc.) test strips or patterns (e.g., FIG. 2). Additionally, in these embodiments, it may be necessary to iteratively determine 126, 146 the decorrelating function $f_i^{X_m}$ and the colorant specific spatially dependent compensating functions $U_i^{X_m}$ as selected terms for one may effect the appropriateness of values selected for the other.

One application for the spatially dependent multi-colorant interaction nonuniformity compensation methods described above, is in the compensation of processed colors in marking engines wherein spatially varying pressure on bias transfer rolls (BTR) may lead to spatially dependent colorant interaction based colorant appearance variations. In some marking engines, BTR pressure varies gradually across the length of a roll or across a width of an image. Therefore, compensating for BTR pressure variations does not require spatial pixel-frequency sampling for compensation. The required decorrelator spatial sampling frequency (e.g., s) can potentially be quite low. For example, adequate compensating decorrelating functions may be determined 126 with a spatial sampling frequency of about 1 inch or even more. As indicated above, interpolation can be used to determine compensated values associated with positions or locations between the sample points. The spatial sampling frequency of the monochrome compensation functions can (e.g., $U_i^{X_m}$) be independent of that of the decorrelating function and can, therefore, be much higher, as appropriate.

Using a lower spatial frequency for the decorrelating function provides a significant savings in memory and computational bandwidth. Additionally, as indicated above, the decorrelating function could be calibrated at a different, for instance, less frequent, temporal schedule than the monochrome $U_i^{X_m}$ compensating functions. For example, the BTR pressure nonuniformity may be relatively constant for several days, while sources of monochrome uniformity, such charge variation due to contamination, might vary at a more rapid rate. It would be a significant savings (time, materials) to compensate for the process color (colorant interaction based) nonuniformity at a lower scheduling rate than that required for the monochrome compensating functions $U_i^{X_m}$. In general, having the compensation method divided into two stages allows one to optimize the temporal update rate and spatial sampling rate for each phenomenon, even if the correlated problem occurs more frequently in time and space.

In general, decorrelating function data, for example, predetermined compensated values stored in a lookup table, can be clustered and/or compressed, using, for example, basis decomposition methods, such as those used to generate reduced sets of TRCs (i.e. singular value decomposition (SVD) and PCA).

As explained above, in some embodiments, the decorrelating function transform can have the functional form of a 3×3 matrix with unity diagonal components. In this case, the decorrelating function is effectively a 6-dimensional vector. Alternatively, the decorrelating function can be implemented as a multi-dimensional lookup table. For instance, where the spatially dependent interaction of three colorants (such as CMY) are to be compensated for, the functional form of a 3-dimensional lookup table (LUT) of size $N_1 \times N_2 \times N_3$ that maps CMY input values to CMY output values can be used. In this case, the decorrelating function is represented by the $N^3$ or $N_1 \times N_2 \times N_3$ LUT entries. The clustering, compression, and noise reduction methods of SVD and/or PCA can be applied to such representations of the decorrelating function.

Figure 5:
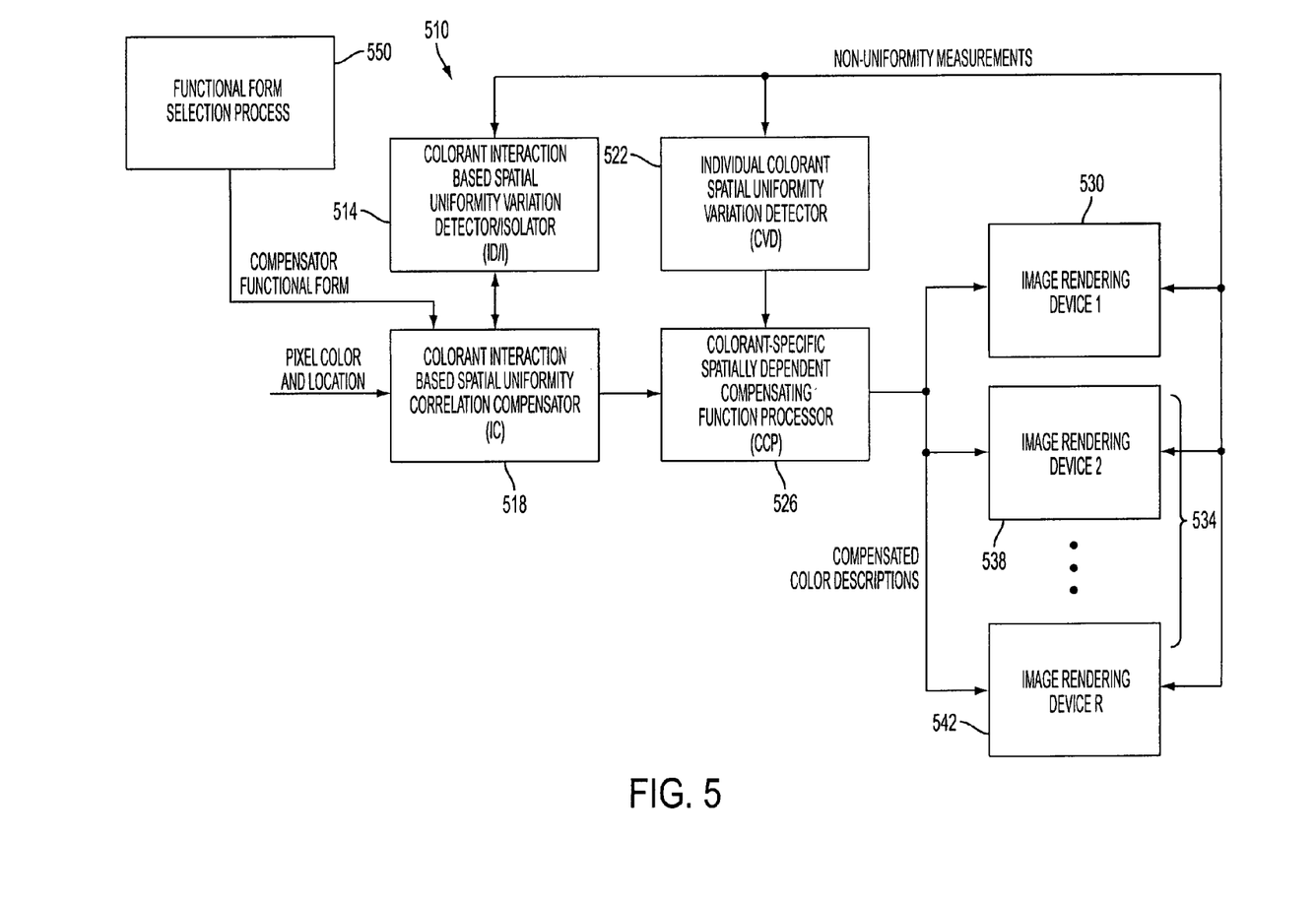
FIG. 5 is a block diagram of an image processing system.

Referring to FIG. 5, an image processing system that is operative to perform methods such as those outlined in FIG. 1 can include a colorant interaction-based spatial uniformity detector/isolator (hereafter ID/I, for interaction detector/isolator) 514 and a colorant interaction-based spatial uniformity correlation compensator (hereafter IC, for interaction compensator) 518. For instance, the ID/I 514 is operative to measure 114 spatial uniformity variations in a rendering process of at least one image rendering device 530, 534, detect 118 and/or isolate 126 colorant interaction-based aspects of the measured 114 spatial uniformity variations and determine 126 a spatially dependent decorrelating function that compensates for the detected 118 or isolated 126 colorant interaction-based aspects of the measured 114 spatial uniformity variations. The IC 518 is operative to receive the spatially dependent decorrelating function (or terms, parameters, elements or coefficients thereof from the ID/I 514, to receive a first color and location description and to process the first color description through the decorrelating function, in accord with the location information, thereby generating a colorant description that is compensated for the spatially dependent colorant interaction affects of the at least one image rendering device 530, 534.

The image processing system 510 may also include an individual colorant spatial uniformity variation detector (hereafter CVD, for colorant variation detector) 522 and a colorant-specific spatially dependent compensating function processor (hereafter CCP, for colorant compensation processor) 526. For instance, the CVD 522 is operative to measure 114 spatial uniformity variations in the rendering process of at least one image rendering device (e.g., 530, 534), detect single colorant-based aspects of the measured 114 spatial uniformity variations and determine 146 colorant-specific spatially dependent compensating functions, denoted, for example, as $U_i^{X_m}$, which compensate for noninteractive or monochrome components or aspects of the spatially dependent colorant appearance variations of the measured spatial uniformity variations. The CCP 526 is operative to receive the colorant-specific spatially dependent compensating functions (or terms, parameters, elements or coefficients thereof from the CVD 522, to receive a second color and location description, and to process the second color description through the colorant-specific spatially dependent compensating functions, in accord with the location description, thereby generating a colorant description that is compensated for spatially dependent individual colorant effects of the at least one image rendering device 530, 534.

As indicated above, the image processing system 510 includes at least one image rendering device 530 and may include a plurality 534 of additional rendering devices including, for example, a second 538 through an $R^{th}$ image rendering device 542.

In a first operational example, the first color and location description received and processed by the ID/I 518 is a raw pixel which is processed 138 by the IC 518 to generate the second color and location description which is received by the colorant-specific spatially dependent compensating function processor (CCP) 526 and processed 150 through the colorant-specific spatially dependent compensating functions in accord with the location description, thereby generating a colorant description that is compensated for spatially dependent individual colorant affects of the at least one image rendering device 530, 534. Indeed, in this configuration, the colorant description generated by the CCP 526 is compensated for both colorant interaction and individual colorant affects of the at least one image rendering device 530, 534.

Alternatively, the order of processing may be reversed so that the CCP (e.g., 526) receives the raw pixel color and location information as the so-called second color and location description mentioned above. In that case, the second or raw pixel color description is processed 154 according to the location description, thereby generating a colorant description that is compensated for spatially dependent individual colorant affects of the at least one image rendering 530, 534 device. The compensated color description is then passed to the IC (e.g., 518) as the so-called first color and location description, wherein the color description is processed 138 in accord with the location description, thereby generating a colorant description that is compensated for spatially dependent colorant interaction effects of the at least one image rendering device 530, 534. Indeed, in this configuration, the colorant description generated by the IC 518 is compensated for both colorant-specific and colorant interaction-based spatially dependent colorant appearance variation effects of the at least one image rendering device.

The ID/I 514 and the ISCSUVD 522 may measure 114 any appropriate aspect of the rendering process associated with colorant interaction-based colorant appearance variation or individual colorant-based colorant appearance variation, respectively. In display devices, such measurements 114 may be related to excitation energy delivered to phosphors or light-emitting diodes or measurements regarding light production efficiencies thereof. In marking engines, the measurements may be of physical aspects of the rendering process, such as, for example, print head alignments and droplet ejection energy delivery. In electrophotographic and/or xerographic environments, the ID/I 514 and/or the CVD 522 may orchestrate measurements 114 of physical aspects of the marking process including, but not limited to, spatially dependent roll pressure variations, charge transfer variations, such as those associated with corotron or scorotron or photoreceptor age, wear and/or contamination, development field variations, cleaning field variations, toner concentration variations, raster output power variations and raster output scanner variations including mirror alignment and contamination.

Alternatively, the ID/I 514 and/or the CVD 522 measure 114 aspects of spatial uniformity variation by orchestrating the rendering, printing or marking of test patterns, such as, for example, test patches or strips (e.g., see FIG. 2). As indicated above, spatially dependent colorant interaction effects may be identified 118 and isolated 122 by measuring 114 test patterns or strips rendered with at least two colorants. Therefore, the ID/I 514 may be operative to measure 114 spatial uniformity variations by orchestrating the printing of a plurality of respective color test strips with at least two colorants based on a respective plurality of target colors. For instance, the respective test strips have respective lengths in respective directions of suspected variation. The ID/I 514 measures 114 a respective plurality of actual colors of a plurality of portions of the respective test strips or patterns at a plurality of locations along the length or direction(s) of suspected variation of the respective test strips.

As indicated above, determining 146 colorant-specific spatially dependent compensating functions can be based on measurements on single colorant or monochrome test patterns, patches or strips. Therefore, the CVD 522 may be operative to orchestrate the printing of a plurality of respective monochrome test strips with the respective single colorant based on a respective plurality of target colors. For instance, the respective test strips may have respective lengths in one or more directions of suspected variation. The CVD 522 may be operative to measure 114 a respective plurality of actual colors of a plurality of portions of the respective monochrome test strips at a plurality of locations along the length or one or more directions of suspected variation of the respective monochrome test strips, thereby generating a plurality of respective actual color measurements. For example, the CVD 522 may be operative to determine 146 the colorant-specific spatially dependent compensating functions based on the plurality of respective target colors and the respective color measurements as described above.

The system 510 may include a functional form selection process 550. For instance, the functional form selection process may include a system designer selecting a functional form for the colorant interaction decorrelating function at system design time. Alternatively, a functional form for the decorrelating function is selected based on an analysis of the measured 114 spatial uniformity variations.

The IC 518 may have or may receive the functional form of the decorrelating function (e.g., $f_i^{X_m}$). For example, the functional form may be that of an M×N matrix. For instance, simulations indicate that a 3×3 matrix functional form provides good decorrelation or colorant interaction compensation. However, as indicated above, other functional forms may be used.

The ID/I 514 may be operative to determine a model of the at least one rendering device 530, 534. For instance, the ID/I 514 may be operative to determine a printer model (e.g., T) describing a relationship between respective input or target colors and respective measured colors at the plurality of locations, the measurement of which is orchestrated by the ID/I 514, wherein the printer model is operative to predict printer performance for other colors and/or other locations. The ID/I 514 may be further operative to use the printer model T and numerical methods to optimize a cost function (e.g., $E_t$) to determine values for terms or parameters of the decorrelating function $f_i^{X_m}$.

In some embodiments, the CVD 522 is operative to determine the colorant-specific spatially dependent compensating functions by using independent component analysis, independent component analysis, principal component analysis (PCA) and/or singular value decomposition (SVD) to determine a reduced set of spatially dependent tone reproduction curves.

In some embodiments, the ID/I 514 and the ISCUVD 522 are operative to cooperate to determine the spatially dependent decorrelating function (e.g., $f_i^{X_m}$), and determine the colorant-specific spatially dependent compensating functions (e.g., $U_i^{X_m}$). For example, the ID/I 514 and the CVD 522 cooperate to determine a printer model (e.g., T) describing a relationship between the respective input or target colors and the respective measured colors at the plurality of locations and predicting printer or rendering device (e.g., 530, 534) color response for arbitrary colors and arbitrary locations by using numerical methods to optimize a cost function (e.g., $E_t$) to determine values for terms parameters or coefficients of the decorrelating function (e.g., $f_i^{X_m}$) and elements of the colorant-specific spatially dependent compensating functions (e.g., $U_i^{X_m}$).

For example, the ID/I 514 and the CVD 522 may be operative to cooperate to use numerical methods to optimize the cost function ($E_t$) in the manners described with reference to equations 4 above. For instance, as indicated above, the ID/I 514 and the CVD 522 may cooperate to use least squares regression, sequential quadratic programming, conjugate gradient search and/or a neural network (possibly including one or more hidden layers) to find values of terms or elements of the decorrelating function and/or terms or elements of the colorant-specific spatially dependent compensating function.

As indicated above, rendered test patterns, patches or strips may be rendered across spatial fields of a plurality of rendering devices (e.g., 530, 534). In those cases, i as it is used in equations 4 and the like herein, may take on values that address or reference particular locations associated with particular rendering devices. In other words, i denotes locations across the plurality of rendering devices or marking engines. One or more of the marking engines 530, 534 may be a xerographic, electrophotographic and/or an ink jet-based marking engine.

The ID/I 514 and the CVD 522 may detect or identify 118 their respective spatial variations or nonuniformities and/or determine 126, 146 their respective compensating functions at different spatial and/or temporal resolutions. For example, measurements 114 and associated calculations of the ID/I 514 may be at a lower resolution than measurements 114 and related calculations of the CVD 522. Furthermore, the measurements 114 and calculations of the ID/I 514 may be performed less frequently than those of the CVD 522.

It will be appreciated that various of the above-disclosed and other features and functions, or alternatives thereof, may be desirably combined into many other different systems or applications. Also the various presently unforeseen or unanticipated alternatives, modifications, variations or improvements therein may be substantially made by those skilled in the art which are also intended to be encompassed by the following claims.

The invention claimed is:

1. A method for compensating for spatially dependent colorant appearance variations in output of an image rendering device, the method comprising:
    measuring spatial uniformity variations in a rendering process of the image rendering device;
    identifying spatially dependent colorant interaction effects of the rendering process based on the measured spatial uniformity variations;
    isolating the identified spatially dependent colorant interaction effects mathematically;
    determining a spatially dependent decorrelating function compensating for just the mathematically isolated spatially dependent colorant interactions of the rendering process;
    determining a color description of a desired color;
    determining a spatial location description regarding a desired location of the desired color; and
    processing the color description of the desired color through the spatially dependent decorrelating function according to the spatial location description, thereby generating a color description compensated for colorant interactions associated with the desired location of the desired color.

2. The method of claim 1 wherein measuring spatial uniformity variations comprises:
    measuring at least one of spatially dependent roll geometry variations, spatially dependent roll pressure variations, spatially dependent charge variations, spatially dependent development field variations, spatially dependent cleaning field variations, spatially dependent toner concentration variation, spatially dependent raster output scanner variations, and spatially dependent raster output power variations.

3. The method of claim 1 wherein measuring spatial uniformity variations comprises:
    printing a plurality of respective color test strips with at least two colorants based on a respective plurality of input or target colors, the respective test strips having respective lengths in a direction of suspected variation; and
    measuring a respective plurality of actual colors of a respective plurality of portions of the respective test strips at a respective plurality of locations along the length of the respective test strips.

4. The method of claim 3 wherein determining a spatially dependent decorrelating function compensating for the spatially dependent colorant interactions comprises:
    selecting a functional form for the decorrelating function, denoted as $f_i^{X_m}$, wherein $X_m$ represents a selected colorant and i denotes a selected spatial location;
    determining a printer model, denoted as T, describing a relationship between the respective input or target colors and the respective measured colors at the plurality of locations and predicting printer color response for arbitrary colors; and
    using numerical methods to optimize a cost function, denoted as $E_t$, to determine values for terms of the decorrelating function $f_i^{X_m}$.

5. The method of claim 4 wherein selecting the functional form for the decorrelating function comprises:
    selecting an M×N matrix functional form wherein M is a number of interacting colorants for which compensation is desired and N is a selected number of terms wherein at least some coefficients of the matrix are functions of spatial location.

6. The method of claim 4 wherein selecting the functional form for the decorrelating function comprises:
    selecting a multi-dimensional lookup table functional form.

7. The method of claim 4 wherein selecting the functional form for the decorrelating function comprises:
    selecting the functional form of a set of simultaneous equations, each equation of the set relating a compensated colorant value to a combination of weighted terms based on input colorant values and/or combinations of input colorant values, wherein at least some of the weighted terms are the terms for which values are to be determined by using numerical methods.

8. The method of claim 1 further comprising:
    determining colorant-specific spatially dependent compensating functions denoted as $U_i^{X_m}$, wherein $X_m$ denotes a selected colorant and i denotes a selected spatial location, which compensate for noninteractive or monochrome components or aspects of the spatially dependent colorant appearance variation; and
    processing the color description compensated for colorant interactions through the colorant-specific spatially dependent compensating functions, thereby generating a color description compensated for both monochrome related aspects and colorant interaction related aspects of spatially dependent colorant appearance variation.

9. The method of claim 8 wherein determining the colorant-specific spatially dependent compensating functions comprises:
   printing a plurality of respective monochrome test strips with a respective single colorant based on a respective plurality of target colors, the respective test strips having respective lengths in a direction of suspected variation;
   measuring a respective plurality of actual colors of a plurality of portions of the respective monochrome test strips at a plurality of locations along the length of the respective monochrome test strips, thereby generating a plurality of respective actual color measurements; and
   determining the colorant-specific spatially dependent compensating functions based on the plurality of respective target colors and the respective color measurements.

10. The method of claim 8 wherein determining a spatially dependent decorrelating function compensating for the spatially dependent colorant interactions and determining colorant-specific spatially dependent compensating functions, denoted as $U_i^{X_m}$, comprises:
   selecting a functional form for the decorrelating function, denoted as, $f_i^{X_m}$ wherein $X_m$ represents the selected colorant and i denotes the selected spatial location;
   determining a printer model, denoted as T, describing a relationship between the respective target colors and the respective measured colors at the plurality of locations and predicting printer performance for other colors and/or other locations; and
   using numerical methods to optimize a cost function, denoted as $E_t$, to determine values for terms of the decorrelating function $f_i^{X_m}$ and the colorant-specific spatially dependent compensating functions, denoted as $U_i^{X_m}$.

11. The method of claim 10 wherein selecting the functional form for the decorrelating function comprises: selecting an M×N matrix functional form wherein M is a number of interacting colorants for which compensation is desired and N is a selected number of terms wherein at least some coefficients of the matrix are functions of spatial location.

12. The method of claim 10 wherein using numerical methods to optimize the cost function comprises:
   defining the cost function, denoted as $E_t$, as:

$E_t = g[E(1), E(2), \ldots E(l), \ldots E(L)] \; L \geq 1$ $E(l) = h(e(l,1), e(l,2), \ldots, e(l,i), \ldots, e(l,S)) \; S \geq 1$ $e(l,i) = T[X''_1(l,i), \ldots X''_m(l,i), \ldots X''_M(l,i)] - Q(l,i) [X''_m(l,i) = U_i^{X_m}(X'_1(l), \ldots X'_m(l), \ldots X'_M(l))]_{\text{for each } m}$ $[X'_m(l,i) = f_i^{X_m}(X_1(l), \ldots X_m(l), \ldots X_M(l))]$ \hfill for each m wherein g(.) is a function accumulating error over the various input or target colors of a plurality of respective multi-colorant color test strips or patches, l is an index identifying a respective one of the plurality of respective color test strips ranging from 1 to L, E(l) is an accumulated color error of the $l^{th}$-indexed color test strip, h(.) is a spatial error accumulation function, i denotes a spatial location along the direction of suspected variation ranging from 1 to S, Q(l,i) is a measured color at location i of the $l^{th}$ test strip, e(l,i) is an error between the measured color Q(l,i) and a color predicted to be rendered by the printer by the model T, M is a number of interacting colorants being compensated for, m is an index for the interacting colorants being compensated for that ranges from 1 to M, $X_m(l)$ denotes the $m^{th}$ input or target colorant value for a respective indexed color test strip l, $f_i^{X_m}$ denotes the decorrelating function output for colorant $X_m$ for spatial location i, $X'_1(l,i), \ldots X'_M(l,i)$ denotes 1 to M spatially dependent colorant interaction compensated colorant values for the target color associated with the indexed color test strip l at location i, $U_i^{X_m}$ denotes an $m^{th}$ colorant-specific spatially dependent compensating function for spatial location i, and $X''_1(l,i), \ldots X''_M(l,i)$ denotes 1 to M colorant values that are compensated for both colorant interaction and monochrome or colorant-specific spatially dependent colorant appearance variation for the target color associated with the indexed color test strip l at location i; and
   using numerical methods to find values of terms of the decorrelating function $f_i^{X_1} \ldots f_i^{X_m}$ and elements of the colorant-specific spatially dependent compensating function $U_i^{X_m}$ that minimize the cost function $E_t$.

13. The method of claim 12 wherein defining the cost function comprises:
   defining the cost function wherein the index l identifies one of the plurality of respective color test strips and the identified respective color test strip is considered to be rendered by, or across spatial fields of a plurality of marking engines, $X_1(l), \ldots X_M(l)$ denotes 1 to M input or target colorant values for a respective indexed color test strip, $X_1(l,i), \ldots X_M(l,i)$ denotes 1 to M compensated colorant values for the respective indexed color test strip for location i, and Q(l,i) is a measured color of the indexed color test strip, and wherein i denotes a selected spatial location associated with one of the plurality of marking engines.

14. The method of claim 1 wherein determining the color description comprises:
   determining colorant-specific spatially dependent compensating functions, denoted as $U_i^k$, which compensate for noninteractive or monochrome components or aspects of the spatially dependent colorant appearance variation; and
   processing a raw color description through the colorant-specific spatially dependent compensating functions, thereby determining the color description of the desired color.

15. The method of claim 1 wherein measuring spatial uniformity variations in a rendering process comprises:
   measuring spatial uniformity variations associated with at least one of a process direction and a cross process direction of a plurality of marking engines.

16. The method of claim 4 wherein selecting a functional form for the decorrelating function, denoted as $f_i^{X_m}$, wherein $X_m$ denotes a selected colorant and i denotes a selected spatial location comprises:
   selecting a functional form for the decorrelating function, denoted as $f_i^{X_m}$, wherein $X_m$ denotes the selected colorant and i denotes the selected spatial location associated with at least one of a process direction and a cross process direction of a plurality of marking engines.

17. The method of claim 15 wherein measuring spatial uniformity variations associated with at least one of a process direction and a cross process direction of the plurality of marking engines comprises:
   measuring spatial uniformity variations associated with at least one of a process direction and a cross process direction of at least one xerographic marking engine.

18. The method of claim 8 wherein determining the spatially dependent decorrelating function and determining the colorant-specific spatially compensating functions comprises:

determining the spatially dependent decorrelating function at a first spatial resolution; and determining the spatially dependent tone reproduction curves at a second spatial resolution.

19. The method of claim 8 wherein determining the spatially dependent decorrelating function and determining the colorant-specific spatially dependent compensating functions comprises:

determining the spatially dependent decorrelating function and determining the spatially dependent tone reproduction curves at different times or based on different events.

20. An image processing system comprising:

at least one image rendering device;

a colorant interaction based spatial uniformity detector/isolator that is operative to measure spatial uniformity variations in a rendering process of the at least one image rendering device, detect or isolate colorant interaction based aspects of the measured spatial uniformity variations and determine a spatially dependent decorrelating function that compensates for the detected or isolated colorant interaction based aspects of the measured spatial uniformity variations; and a colorant interaction based spatial uniformity variation compensator that is operative to receive the spatially dependent decorrelating function from the colorant interaction based spatial uniformity detector/isolator, to receive a first color and location description and to processes the first color description through the decorrelating function, in accord with the location information, thereby generating a colorant description that is compensated for spatially dependent colorant interaction effects of the at least one image rendering device.

21. The system of claim 20 further comprising:

an individual colorant spatial uniformity variation detector that is operative to measure spatial uniformity variations in the rendering process of the at least one image rendering device, detect single colorant based aspects of the measured spatial uniformity variations and determine colorant-specific spatially dependent compensating functions, denoted as $U_i^k$, which compensate for noninteractive or monochrome components or aspects of the spatially dependent colorant appearance variations of the measured spatial uniformity variations; and a colorant-specific spatially dependent compensating function processor that is operative to receive the colorant-specific spatially dependent compensating functions from the individual colorant spatial uniformity variation detector, to receive a second color and location description, and to processes the second color description through the colorant specific spatially dependent compensating functions, in accord with the location information, thereby generating a colorant description that is compensated for spatially dependent individual colorant effects of the at least one image rendering device.

22. The system of claim 21 wherein the colorant-specific spatially dependent compensating function processor is operative to receive and process the colorant description that is compensated for spatially dependent colorant interaction effects as the second color description.

23. The system of claim 21 wherein the colorant interaction based spatial uniformity variation detector/compensator is operative to receive and process the colorant description that is compensated for spatially dependent individual colorant effects as the first color description.

24. The system of claim 20 wherein the colorant interaction based spatial uniformity detector/isolator is operative to measure spatial uniformity variations by measuring at least one of spatially dependent roll pressure variations, spatially dependent roll geometry variations, spatially dependent charge variations, spatially dependent field variations, spatially dependent toner concentration variation, spatially dependent raster output scanner variations, and spatially dependent raster output power variations.

25. The system of claim 20 wherein the colorant interaction based spatial uniformity detector/isolator is operative to measure spatial uniformity variations by printing a plurality of respective color test strips with at least two colorants based on a respective plurality of input or target colors, the respective test strips having respective lengths in a direction of suspected variation, and measuring a respective plurality of actual colors of a plurality of portions of the respective test strips at a plurality of locations along the length of the respective test strips.

26. The system of claim 25 wherein the colorant interaction based spatial uniformity variation detector/compensator comprises:

a function form of the decorrelating function, denoted as $f_i^{X_m}$, wherein $X_m$ denotes a selected colorant and i denotes a selected spatial location, and wherein the colorant interaction spatial uniformity detector/isolator is operative to determine a printer model, denoted as T, describing a relationship between the respective input or target colors and the respective measured colors at the plurality of locations and predict printer color response for arbitrary colors and to use numerical methods to optimize a cost function, denoted as $E_f$, to determining values for terms of the decorrelating function $f_i^{X_m}$.

27. The system of claim 26 wherein the colorant interaction based spatial uniformity variation detector/compensator comprise:

an M×N matrix functional form wherein M is a number of interacting colorants for which compensation is desired and N is a selected number of terms wherein at least some coefficients of the matrix are functions of spatial location.

28. The system of claim 21 wherein the individual colorant spatial uniformity variation detector is operative to measure the spatial uniformity variations by printing a plurality of respective monochrome test strips with a respective single colorant based on a respective plurality of target colors, the respective test strips having respective lengths in a direction of suspected variation, measuring a respective plurality of actual colors of a plurality of portions of the respective monochrome test strips at a plurality of locations along the length of the respective monochrome test strips, thereby generating a plurality of respective actual color measurements and determining the colorant-specific spatially dependent compensating functions based on the plurality of respective target colors and the respective color measurements.

29. The system of claim 21 wherein the colorant interaction spatial uniformity detector/isolator and the individual colorant spatial uniformity variation detector are operative to cooperate to determine the spatially dependent decorrelating function, denoted as $f_i^k$, and determine the colorant-specific spatially dependent compensating functions, denoted as $U_i^{X_m}$, wherein $X_m$ denotes a selected colorant and i denotes a selected spatial location, by determining a printer model, denoted as T, describing a relationship between the respective target colors and the respective measured colors at the plurality of locations and predicting printer performance for other colors and/or other locations, and using numerical methods to optimize a cost function, denoted as $E_t$, to determine values for terms of the decorrelating function $f_i^k$ and elements of the colorant-specific spatially dependent compensating functions, denoted as $U_i^k$.

30. The system of claim 21 wherein the colorant interaction spatial uniformity detector/isolator and the individual colorant spatial uniformity variation detector are operative to cooperate to use numerical methods to optimize the cost function by defining the cost function, denoted as $E_t$, as:

$E_t = g[E(1), E(2), \ldots E(l), \ldots E(L)]$ $L \geq 1$ $E(l) = h(e(l,1), e(l,2), \ldots, e(l,i), \ldots, e(l,S))$ $S \geq 1$ $e(l,i) = T[X''_1(l,i), \ldots X''_m(l,i), \ldots X''_M(l,i)] - Q(l,i)$ $[X''_m(l,i) = U_i^{X_m}(X'_1(l), \ldots X'_m(l), \ldots X'_M(l))]_{\text{for each } m}$
$[X'_m(l,i) = f_i^{X_m}(X_1(l), \ldots X_m(l), \ldots X_M(l))]_{\text{for each } m}$ wherein g(.) is a function accumulating error over the various input or target colors of a plurality of respective multi-colorant color test strips or patches as discussed with reference to FIG. 2, l is an index identifying a respective one of the plurality of respective color test strips ranging from 1 to L, E(l) is an accumulated color error of the $l^{th}$-indexed color test strip, h(.) is a spatial error accumulation function, i denotes a spatial location along the direction of suspected variation ranging from 1 to S, Q(l,i) is a measured color at location i of the $l^{th}$ test strip, e(l,i) is an error between the measured color Q(l,i) and a color predicted to be rendered by the printer by the model T, M is a number of interacting colorants being compensated for, m is an index for the interacting colorants being compensated for that ranges from 1 to M, $X_m(l)$ denotes the $m^{th}$ input or target colorant value for a respective indexed color test strip l, $f_i^{X_m}$ denotes the decorrelating function output for colorant $X_m$ for spatial location i, $X'_1(l,i), \ldots X'_M(l,i)$ denotes 1 to M spatially dependent colorant interaction compensated colorant values for the target color associated with the indexed color test strip l at location i, $U_i^{X_m}$ denotes an $m^{th}$ colorant-specific spatially dependent compensating function for spatial location i, and $X''_1(l,i), \ldots X''_M(l,i)$ denotes 1 to M colorant values that are compensated for both colorant interaction and monochrome or colorant-specific spatially dependent colorant appearance variation for the target color associated with the indexed color test strip l at location i; and using numerical methods to find values of terms of the decorrelating function $f_i^{X_1} \ldots f_i^{X_m}$ and elements of the colorant-specific spatially dependent compensating function $U_i^{X_m}$ that minimize the cost function $E_t$.

31. The system of claim 30 wherein the colorant interaction spatial uniformity detector/isolator and the individual colorant spatial uniformity variation detector are operative to cooperate to use at least one of sequential quadratic programming, conjugate gradient searching, a neural network and a neural network with at least one hidden layer to at least one of find the values of the terms of the decorrelating function and the elements of the colorant-specific spatially dependent compensating functions.

32. The system of claim 30 wherein the colorant interaction spatial uniformity detector/isolator and the individual colorant spatial uniformity variation detector are operative to cooperate to define the cost function such that the index l identifies one of the plurality of respective color test strips and the identified respective color test strip is considered to be rendered by, or across spatial fields of, a plurality of marking engines, $X_1(l), \ldots X_M(l)$ denotes 1 to M input or target colorant values for a respective indexed color test strip, $X_1(l, i), \ldots X_M(l,i)$ denotes 1 to M compensated colorant values for the respective indexed color test strip for location i, and Q(l,i) is a target or expected measured color of the indexed color test strip, and wherein i denotes a selected spatial location associated with one of the plurality of marking engines.

33. The system of claim 21 wherein the colorant interaction spatial uniformity detector/isolator and the individual colorant spatial uniformity variation detector are operative to cooperate to measure spatial uniformity variations associated with at least one of a process direction and a cross process direction of a plurality of marking engines.

34. The system of claim 21 wherein the colorant interaction spatial uniformity detector/isolator and the individual colorant spatial uniformity variation detector are operative to cooperate to measure spatial uniformity variations associated with at least one of a process direction and a cross process direction of a plurality of marking engines including at least one xerographic print engine.

35. The system of claim 21 wherein the colorant interaction spatial uniformity detector/isolator and the individual colorant spatial uniformity variation detector are operative to cooperate to determine the spatially dependent decorrelating function at a first spatial resolution and determine the colorant-specific spatially dependent compensating functions at a second spatial resolution.

36. The system of claim 21 wherein the colorant interaction spatial uniformity detector/isolator and the individual colorant spatial uniformity variation detector are operative to cooperate to determine the spatially dependent decorrelating function with a first temporal frequency and determine the colorant-specific spatially dependent compensating functions with a second temporal frequency.

37. A method for compensating for spatially dependent colorant appearance variations in output of an image rendering device, the method comprising:

measuring spatial uniformity variations in a rendering process of the image rendering device;

identifying spatially dependent colorant interaction effects of the rendering process based on the measured spatial uniformity variations;

isolating the identified spatially dependent colorant interaction effects mathematically;

determining a spatially dependent decorrelating function compensating for just the mathematically isolated spatially dependent colorant interactions of the rendering process;

determining a set of colorant-specific spatially dependent compensating functions;

receiving a color description of a desired color;

receiving a spatial location description regarding a desired location of the desired color;

processing the color description of the desired color through the spatially dependent decorrelating function according to the spatial location description, thereby generating a color description compensated for colorant interactions associated with the desired location of the desired color; and processing the color description compensated for colorant interactions through selected ones of the colorant-specific spatially dependent compensating functions according to the spatial location description, thereby generating a color description compensated for colorant interactions associated with the desired location of the desired color.

* * * * *